United States Patent
Waheed et al.

(10) Patent No.: US 9,479,288 B2
(45) Date of Patent: Oct. 25, 2016

(54) TECHNIQUES FOR TIME-DOMAIN FRAME SYNCHRONIZATION OF PACKETS

(71) Applicant: FREESCALE SEMICONDUCTOR, INC., Austin, TX (US)

(72) Inventors: Kuhurram Waheed, Austin, TX (US); Steven M. Bosze, Cedar Park, TX (US); Kevin B. Traylor, Austin, TX (US); Jianqiang Zeng, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 15 days.

(21) Appl. No.: 14/306,692

(22) Filed: Jun. 17, 2014

(65) Prior Publication Data
US 2015/0365224 A1    Dec. 17, 2015

(51) Int. Cl.
| | |
|---|---|
| *H04J 3/06* | (2006.01) |
| *H04L 1/00* | (2006.01) |
| *H04B 3/54* | (2006.01) |
| *H04L 7/04* | (2006.01) |
| *H04L 27/26* | (2006.01) |

(52) U.S. Cl.
CPC ............. *H04L 1/0045* (2013.01); *H04B 3/542* (2013.01); *H04L 7/042* (2013.01); *H04L 27/26* (2013.01)

(58) Field of Classification Search
None
See application file for complete search history.

(56) References Cited

U.S. PATENT DOCUMENTS

| | | | |
|---|---|---|---|
| 6,888,790 B2 | 5/2005 | Kilani | |
| 8,139,614 B2 | 3/2012 | Razazian | |
| 8,165,172 B2 | 4/2012 | Razazian | |
| 2009/0154606 A1* | 6/2009 | Li | H04L 25/061 375/341 |
| 2011/0039512 A1* | 2/2011 | Ferchland | H04W 52/0229 455/343.1 |
| 2011/0285572 A1* | 11/2011 | Alon | G01S 13/78 342/37 |
| 2015/0078172 A1* | 3/2015 | Chowdiah | H04L 43/12 370/241 |
| 2015/0270910 A1* | 9/2015 | Bernstein | H04B 3/54 375/257 |

* cited by examiner

*Primary Examiner* — Otis L Thompson, Jr.

(57) ABSTRACT

A technique for frame synchronization in a communication system includes performing symbol correlation on received signal samples. A determination is made as to whether a magnitude of the symbol correlation is greater than a first threshold. In response to the magnitude of the symbol correlation being greater than the first threshold, an indication is provided that the received symbol is a valid symbol (e.g., a SYNCP symbol or SYNCM symbol). In response to the magnitude of the symbol correlation being less than the first threshold, an indication is provided that the received symbol is an indeterminate symbol (e.g., an invalid symbol or a SYNCM/2 symbol).

19 Claims, 8 Drawing Sheets

TECHNIQUES FOR TIME-DOMAIN FRAME SYNCHRONIZATION OF PACKETS

BACKGROUND

1. Field

This disclosure relates generally to synchronization of packets and, more specifically, to time-domain synchronization of packets.

2. Related Art

Channel coding or forward error correction (FEC) is a technique used in communication systems for controlling and mitigating errors in data communication over unreliable or noisy channels. A transmitter of a communication system employing an FEC scheme adds controlled redundancy to an information bit stream before modulation. In a receiver, an FEC decoder may exploit the redundancy added in the transmitter while processing the demodulated bits to correct data communication errors. In general, the efficiency of an FEC decoder is improved when, instead of the demodulated hard bits, the decoder operates on soft information which, in some way, represents the likelihood of each demodulated bit being a '0' or a '1'. The soft information that represents each bit may be calculated as a function of the corresponding demodulated bit/symbol and the estimated noise variance affecting the bit. If the channel is not static but varies in time and/or frequency, the effective noise variance affecting each bit also varies accordingly.

A symbol for the simplest modulations can be described as a 'pulse' in digital baseband transmission or a 'tone' in passband transmission using modems that represents an integer number of bits. For more complex modulations, a transmission symbol may be mapped to a set of primitive time-domain or frequency-domain waveforms using a number of communication/signal processing mapping techniques. Theoretically, a symbol is a waveform, a state, or a significant condition of a communication channel that persists for a fixed period of time. In general, a transmitting device transmits a sequence of symbols via a communication channel at a fixed symbol rate and a receiving device detects the sequence of symbols on the communication channel in order to reconstruct transmitted data. In various applications, there may be a direct correspondence between a symbol and a unit of data (e.g., each symbol may encode one or more binary digits or bits), data may be represented by transitions between symbols, or data may be represented by a sequence of symbols.

Channel fading and interference are two examples of factors that cause a channel to vary in time and/or frequency. A communication system designed to work in an environment with channel fading and interference typically provides, in each transmission, a training sequence for obtaining an initial estimate of a channel and/or pilot sequences interspersed with a data-bearing signal to allow for tracking channel variations. In general, pilot sequences facilitate updating an estimated noise variance and consequently improve FEC decoder performance at the expense of reduced bandwidth efficiency.

A communication system may also implement transmitters that use differential modulation instead of providing pilot sequences to conserve bandwidth efficiency when the rate of channel fluctuations is relatively slow compared to symbol duration. In differential modulation, a preceding transmitted symbol acts as reference for a current modulated symbol to facilitate non-coherent demodulation in a receiver.

Smart grid applications communicating over power-lines may implement differentially or coherently modulated systems. Power-line communication channels are characterized by relatively slow channel variations but are also typically affected by impulse noise and narrowband interference caused by the operation and switching of appliances, electronics, and other electrical devices connected to a power-line. Some narrowband interference may be present for the entire duration of a communication packet or may arise only for a limited time during a packet. Due to the nature of differential modulation, drastic instantaneous channel fluctuations may cause cascading demodulation errors that lead to significant degradation of soft information provided to an FEC decoder which results in degradation of overall system performance.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale.

DETAILED DESCRIPTION

Figure 1:
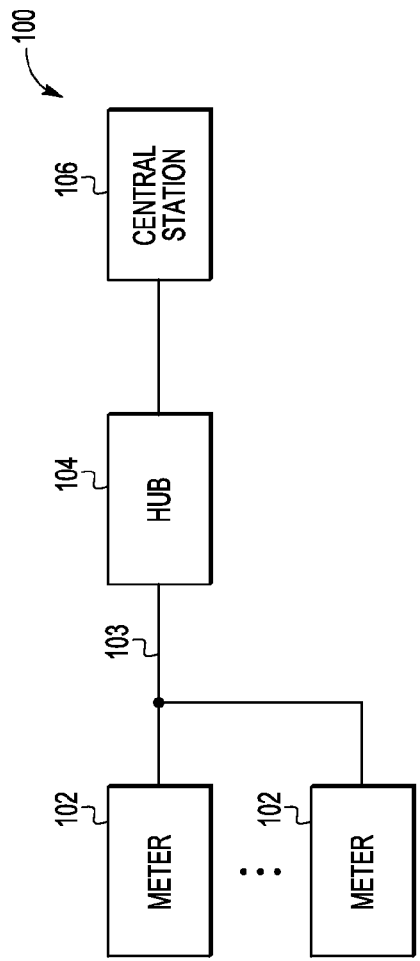
FIG. 1 is a block diagram of a relevant portion of a power-line communication (PLC) system that is configured to implement time-domain synchronization of packets according to the present disclosure.

Classic time-domain correlation based synchronization can fail to achieve reliable burst synchronization in the presence of interference (e.g., narrowband (NB) and/or co-existence related interference), fading, and impulsive noise. According to various embodiments of the present invention, a frame synchronization decision tree is defined in which once preamble symbol synchronization is achieved, the tracking of a location of each subsequent synchronization symbol within a frame preamble is attempted. In particular, the disclosed frame synchronization techniques quantify each received preamble symbol as either a valid symbol or an invalid (corrupted) symbol. If one or more corrupted symbols are encountered, then a hypothesis of samples at which frame synchronization is possible is made and the hypothesis is tested. If a subsequent valid preamble symbol is received, tracking is started again.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. As may be used herein, the term 'coupled' encompasses a direct electrical connection between elements or components and an indirect electrical connection between elements or components achieved using one or more intervening elements or components. It should be appreciated that different communication standards use the words 'frame' and 'packet' interchangeably. As may be used herein, the terms 'frame error rate' and 'packet error rate' are interchangeable. As may also be used herein, the terms 'frame synchronization' and 'packet synchronization' are interchangeable.

Techniques for frame synchronization in a communication system may include performing symbol correlation on received signal samples. A determination is then made as to whether a magnitude of the symbol correlation is greater than a first threshold. In response to the magnitude of the symbol correlation being greater than the first threshold, an indication is provided that the received symbol is a valid symbol. In response to the magnitude of the symbol correlation being less than the first threshold, an indication is provided that the received symbol is an indeterminate symbol.

As previously mentioned, classic time-domain correlation based synchronization can fail to achieve reliable burst synchronization in the presence of interference, fading, and impulsive noise. At least one conventional synchronization approach has employed a mixture of classic time-domain correlation (for preamble symbol synchronization) cascaded with time-domain frame synchronization. However, in the conventional synchronization approach, frame synchronization may not be achieved as symbol synchronization can fail due to impulsive noise. For example, the above mentioned types of noise can destroy multiple preamble symbols of a packet due to noise magnitude and/or frequency selective packet corruption.

Harsh signal environments are typical in power-line communication (PLC) and wireless frequency bands, such as the industrial, scientific, and medical (ISM) radio frequency band. In a typical PLC communication system, a signal acquisition process involves first scanning for a symbol boundary and, when a symbol boundary is detected, searching for a frame boundary identifier. According to various embodiments, as there is a potential for one or more preamble symbols to be destroyed (e.g., by noise and/or fading, etc.) each preamble symbol is tested to determine whether the preamble symbol is a valid synchronization symbol (e.g., SYNCP, SYNCM, or otherwise). Frame synchronization is achieved by either locating a frame synchronization marker (e.g., SYNCM) or estimating a candidate frame header start that is tested to determine whether a frame header is successfully decoded. In this manner, frame synchronization may be reliably achieved even when one or more preamble symbols are destroyed by an impulsive transient.

The disclosed techniques exhibit significant performance benefit, as compared with conventional time-domain implementations that perform a single-pass correlation. In one or more embodiments, a frame synchronization decision tree is defined in which once preamble symbol synchronization is achieved, the tracking of a location of each subsequent synchronization symbol within a frame preamble is attempted. The disclosed techniques quantify each received preamble symbol as either a valid symbol or an invalid (corrupted) symbol. If one or more corrupted symbols are encountered, then a hypothesis of samples at which frame synchronization is possible is made and the hypothesis is tested. If a subsequent valid preamble symbol is received, tracking is started again. For example, the disclosed techniques may be implemented in a narrowband-power-line communication (NB-PLC) orthogonal frequency division multiplexing (OFDM) solutions using G3, ITU G.hnem, or IEEE P1901.2 standards or using the IEEE 802.15.4 family of standards (e.g., Zigbee/IEEE Std. 802.15.4-2011 (O-QPSK PHYs), IEEE Std. 15.4g-2012/IEEE 802.15.4k-2013 (SUN/LECIM FSK PHYs), IEEE Std. 15.4g-2012 (SUN OFDM PHY), IEEE 802.15.4m-TVWS (OFDM PHYs)) implemented in noisy frequency bands, such as the ISM bands (e.g., 2.4 GHz and 900 MHz frequency bands). For example, the disclosed techniques may be implemented in a PLC G3 preamble detector.

It should be appreciated that the disclosed techniques may be employed with various modulation schemes (e.g., quadrature amplitude modulation (QAM) and phase-shift keying (PSK) modulation schemes, frequency shift keying (FSK) and their variations). Advantageously, the disclosed techniques tend to reduce packet loss and, as such, reduce re-transmissions, reduce required transmission power, and increase throughput and coverage. The disclosed techniques are particularly useful under impulse noise conditions experienced by power-line channels. The disclosed techniques do not require interference detection and are robust to impulses, which are different from interference. The disclosed techniques may be implemented in hardware (e.g., in an application specific integrated circuit (ASIC) or a field-programmable gate array (FPGA)) or using a combination of hardware and software (e.g., using a programmed general purpose processor or a programmed digital signal processor (DSP)). It should also be appreciated that the disclosed techniques are not limited to OFDM demodulation. In general, the disclosed techniques are broadly applicable to time-domain synchronization using repeated preamble symbols. The disclosed techniques are also applicable to various modulations techniques, e.g., FSK, GFSK, MSK, GMSK and/or O-QPSK/DSSS modulation techniques.

In general, the disclosed techniques employ time-domain correlation, classify correlation output as a valid or an invalid preamble symbol, track an anticipated location of preamble symbols, and test buffered samples for frame header decoding. The disclosed techniques are particularly advantageous when multiple preamble symbols are destroyed by impulsive disturbances. In one or more embodiments, preamble symbols are classified as either positive, negative, or invalid (corrupted). In the event that multiple preamble symbols are corrupted the disclosed techniques may employ a time hysteresis approach to detect a start location of a frame header to achieve frame synchronization. In general, the disclosed techniques provide a frame synchronization decision tree that once preamble symbol synchronization is achieved tracks the location of each subsequent synchronization symbol within a frame preamble.

With reference to FIG. 1, an exemplary communication system 100 is illustrated that includes a plurality of smart meters 102 that are configured, according to one or more embodiments of the present disclosure, to perform time-domain synchronization of packets and may, for example, report a utility usage (electric, gas, and/or water, etc.) to a central station 106. The communication system 100 also includes a hub 104 that is coupled to the meters 102 via a power-line 103. In various embodiments, the meters 102 and the hub 104 are coupled to the power-line 103 via a direct or indirect electrical connection. As is illustrated in FIG. 1, the hub 104 is coupled (e.g., via a direct or indirect electrical connection) to the central station 106. The central station 106 may include one or more processors (each of which may include one or more processor cores) coupled to a storage subsystem, which may include, for example, application appropriate amounts of memory (e.g., dynamic random access memory (DRAM), static RAM (SRAM), and/or read-only memory (ROM)), and/or one or more mass storage devices, such as magnetic media (tape or disk) drives and/or optical disk drives. It should be appreciated that the hub 104 and the central station 106 may also be configured to perform time-domain synchronization of packets, according to the present disclosure. As used herein, a 'hub' or a 'data concentrator' is a device that couples multiple communication end devices together to form a single network segment or acts as a repeater of the data communication to enable implementation of a multi-hop larger subnet.

Figure 2:
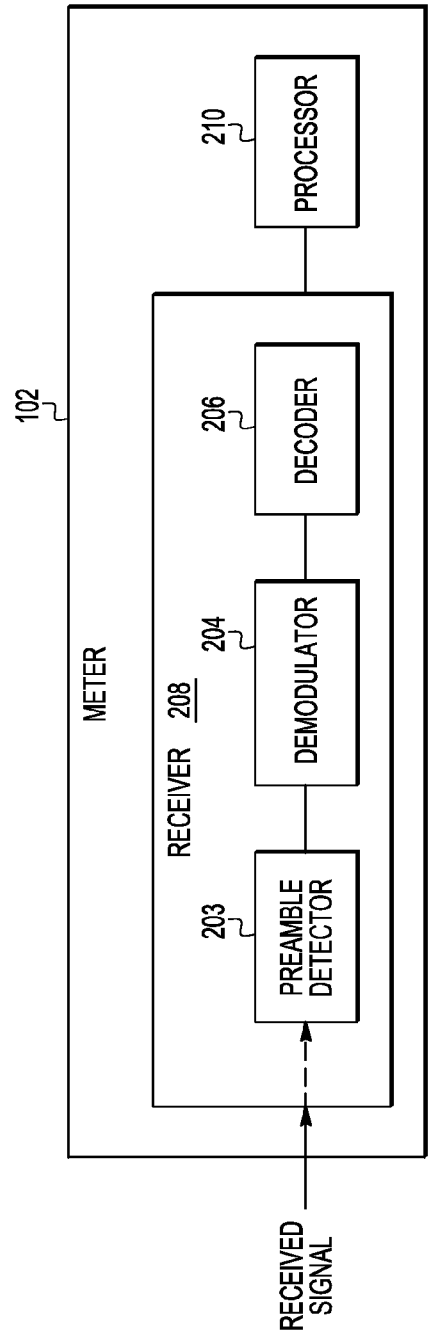
FIG. 2 is a block diagram of a relevant portion of an exemplary smart meter that may be employed in the system of FIG. 1.

With reference to FIG. 2, a relevant portion of an exemplary smart meter 102 is illustrated as including a receiver 208 (that receives a transmitted received signal) coupled to a processor 210. The processor 210 may be, for example, an ASIC or FPGA or a programmed general purpose processor or a programmed DSP. The receiver 208 includes, for example, a preamble detector 203, a demodulator 204, and a decoder 206 and may include other components (not shown). The preamble detector 203 is coupled to the demodulator 204, which is coupled to the decoder 206. The demodulator 204 may be, for example, a differential demodulator.

The preamble detector 203 is configured to perform time-domain synchronization of packets according to the present disclosure. More specifically, the preamble detector 203 is configured to employ time-domain correlation, classify correlation output as a valid preamble symbol or an invalid preamble symbol, and track a location of preamble symbols (see FIGS. 5 and 6). The demodulator 204 may, for example, be configured to generate bit log-likelihood ratios (LLRs) for received symbols. The decoder 206, which may, for example, be implemented as a Viterbi decoder, functions to decode received symbols. It should be appreciated that components of the receiver 208 that are not deemed desirable for understanding the disclosed subject matter have been omitted for the sake of brevity. It should be understood that meter 102 also includes a transmitter and other components (e.g., a monitoring device, input/output (I/O), and control circuitry), which have also been omitted for the sake of brevity.

Figure 3:
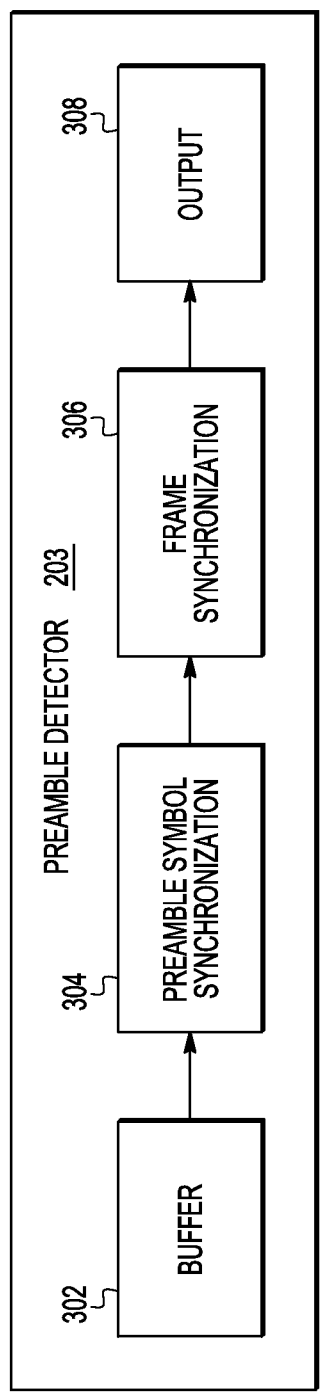
FIG. 3 is a block diagram of a relevant portion of exemplary functional blocks that may be employed in a preamble detector implemented in the smart meter of FIG. 2.

With reference to FIG. 3, exemplary components that may be employed in the preamble detector 203 of FIG. 2 are illustrated. As is shown, the preamble detector 203 includes a buffer block 302 (e.g., including one or more circular buffers) that stores samples of a received signal. Symbol synchronization block 304 accesses samples from the buffer block 302 and performs operations on the samples to determine whether a valid preamble symbol can be detected. Upon preamble symbol detection, frame synchronization block 306 performs operations to determine whether a valid frame control header can be detected. When frame synchronization is achieved, output block 308 may assert various flags (e.g., a frame synchronization flag (FRAME_SYNC_FLAG)) and provide applicable frame timing information (e.g., in the form of a FRAME_TIMING signal).

Figure 4:
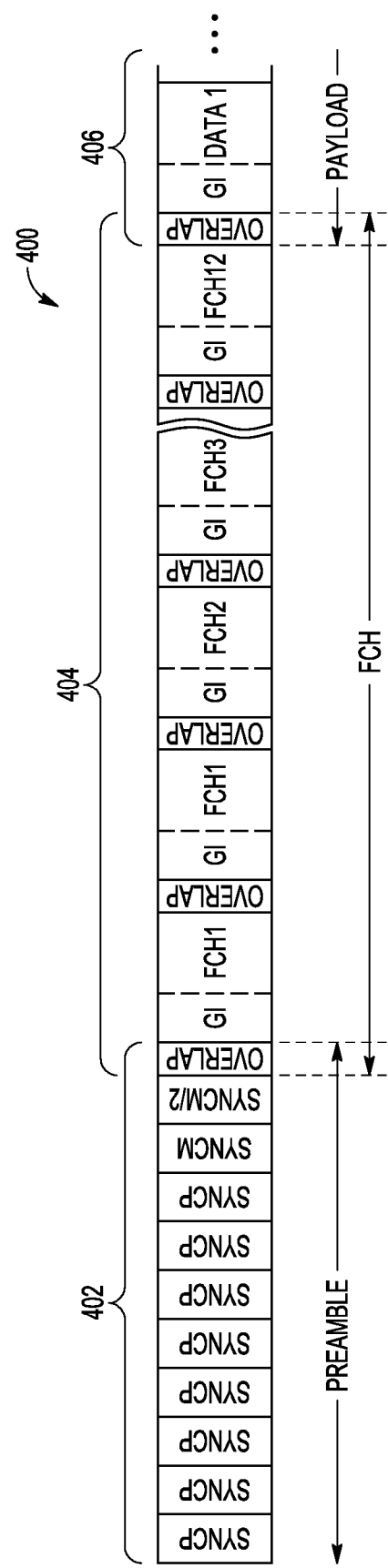
FIG. 4 is a diagram of an exemplary frame structure for ITU G.9903/PLC-G3, which has a similar structure to the frame structure of IEEE P1901.2/ITU G.9902 (G.hnem).

FIG. 4 is a diagram of an exemplary frame structure 400 for an ITU G.9903/PLC-G3 packet. It should be appreciated that the techniques disclosed herein are applicable to other frame structures (e.g., IEEE P1901.2/ITU G.9902 (G.h-nem)) that employ similar preamble sequences. As is illustrated, the frame structure includes a preamble signal 402, a frame control header (FCH) 404, and a payload 406 that includes multiple data symbols. The preamble signal 402 includes a number of preamble symbols (labeled 'SYNCP' and 'SYNCM'). As is shown, the FCH 404 includes a number of FCH symbols (labeled 'FCH1' through 'FCH12) and a respective cyclic prefix guard interval (GI) prior to each FCH symbol. The GI functions to prevent inter-symbol interference. The FCH 404 may specify the number of data symbols in a packet, symbol modulation type, etc. As is illustrated, the payload 406 includes a number data symbols (as specified by the FCH 404) separated by GIs.

Figure 5:
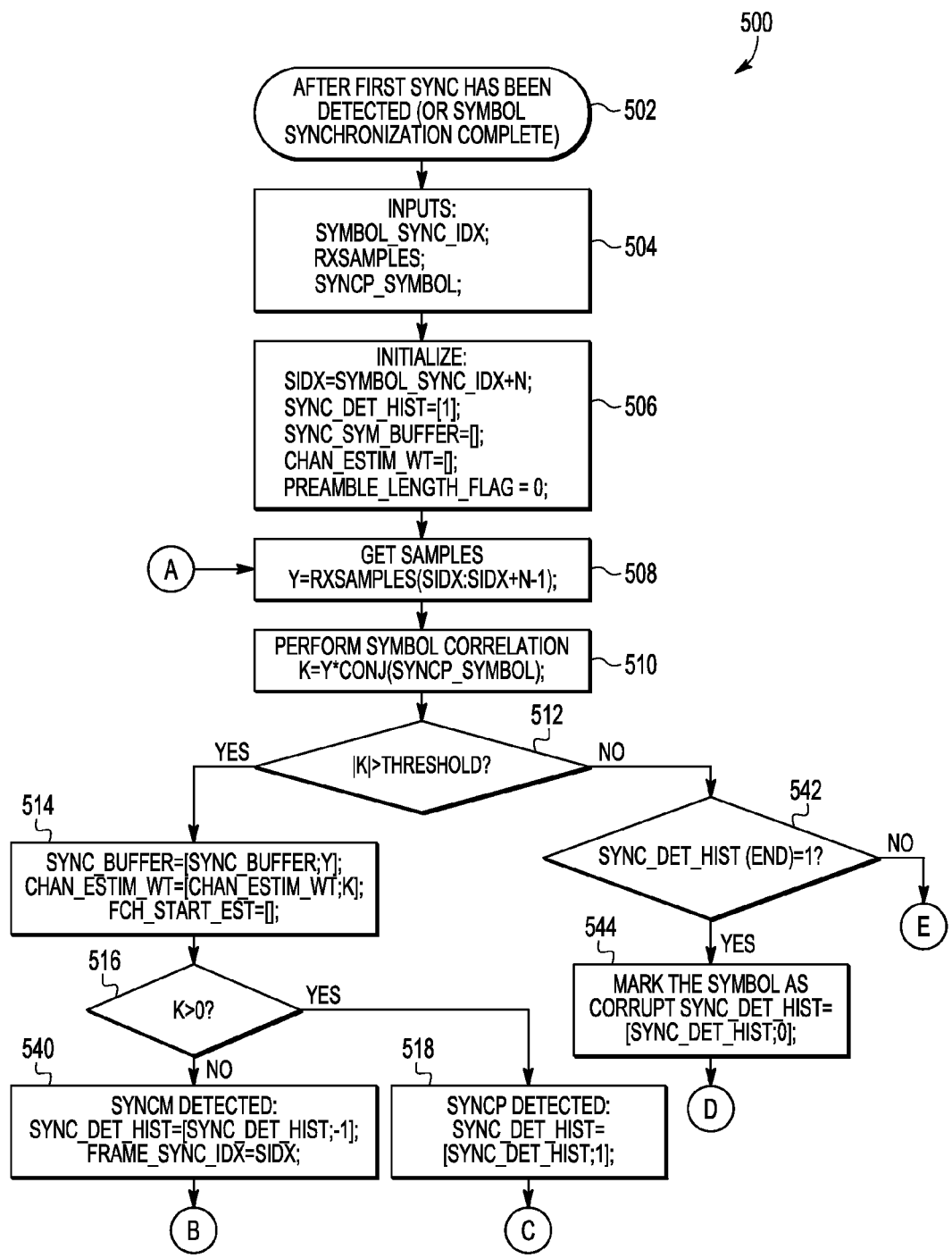
FIGS. 5 and 6 provide a flowchart of an exemplary frame synchronization process implemented by, for example, the preamble detector of FIG. 3.
Figure 6:
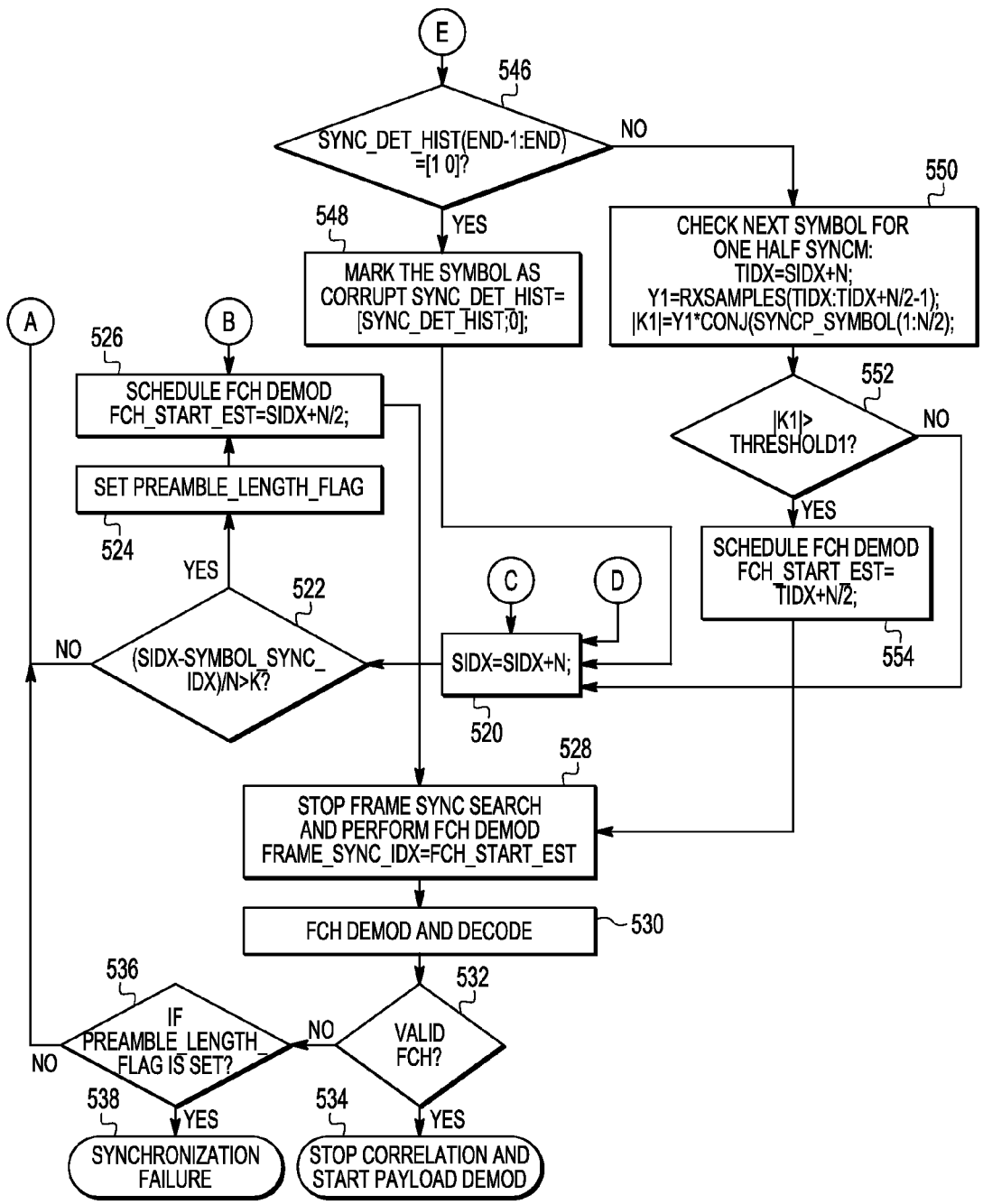

With reference to FIGS. 5 and 6, an exemplary frame synchronization process 500, which may be implemented by functional blocks of the preamble detector 203 according to an embodiment of the present disclosure, is illustrated. While specific blocks are referenced in the description of FIGS. 5 and 6 it should be appreciated that other blocks may perform the function described. In the description of FIGS. 5 and 6, 'N' is the number of samples in an OFDM preamble symbol, 'K' is the total number of full preamble symbols in a preamble, 'threshold' corresponds to a threshold for a preamble symbol or synchronization symbol (SYNC), e.g., SYNCP and SYNCM, detection, and 'threshold1' corresponds to a threshold for SYNCM/2 detection (e.g., threshold1=threshold/2). As one example, 'N' may be set equal to two-hundred fifty-six and 'K' may be set equal to nine. The process 500 is initiated in block 502 after a first synchronization symbol (SYNC) has been detected by the symbol synchronization block 304 (or symbol synchronization is complete). It should be appreciated that the first synchronization symbol detected may correspond to, for example, a SYNCP most of the time or a SYNCM in extreme conditions.

Next, in block 504, a number of inputs (e.g., a symbol synchronization index (SYMBOL_SYNC_IDX), a size of a receive signal buffer in samples (RXSAMPLES), and a sample pattern (SYNCP_SYMBOL)) are received by the frame synchronization block 306. It should be appreciated that multiple sample patterns may be employed if the different preamble symbols are not phase varied versions of each other. In the description herein, SYNCP and SYNCM have the same magnitude and are one-hundred eighty degrees out-of-phase with each other. However, it should be appreciated that different synchronization symbols may have different amplitudes and phases. The symbol synchronization index (SYMBOL_SYNC_IDX) corresponds to a sample at which a detected synchronization signal starts.

Then, in block 506, a number of variables (SIDX, SYNC_DET_HIST, SYNC_SYM_BUFFER, CHAN_ESTIM_WT, and PREAMBLE_LENGTH FLAG) are initialized by the frame synchronization block 306. The variable SIDX corresponds to a frame search starting index. The variable SYNC_DET_HIST provides a history of whether a SYNCP or a SYNCM was found. For example, a positive one may correspond to a SYNCP and a negative one may correspond to a SYNCM. The variable SYNC_SYM_BUFFER corresponds to a buffer (e.g., implemented in the buffer block 302) that stores all samples in a symbol in the event that previous symbols need to be reexamined. The variable CHAN_ESTIM_WT may be used to weight subcarriers in an OFDM signal, if needed. For example, weighting may be useful to spectrally correct for a frequency selective nature of a transmission channel and/or apply non-uniform weighting to received OFDM sub-carriers for frequency selective processing. The variable PREAMBLE_LENGTH_FLAG corresponds to a flag that indicates whether a preamble length is exceeded.

Next, in block 508, the frame synchronization block 306 retrieves samples from the buffer block 302 starting at a first point (SIDX) and ending at a second point (SIDX+N−1). Then, in block 510, the frame synchronization block 306 performs symbol correlation (K=Y*CONJ(SYNC_SYMBOL)) by multiplying the retrieved samples 'Y' by a complex conjugate of the SYNCP symbol pattern (SYNCP_SYMBOL). As above, if other preamble symbols are not phase varied version of the SYNCP, then the other preamble symbols will also require correlation with an appropriate symbol pattern. Then, in decision block 512, a determination is made by the frame synchronization block 306 as to whether the symbol is a valid symbol (e.g., a SYNCP or a SYNCM) by determining whether a magnitude of the symbol correlation 'K' is greater than the 'threshold' or an indeterminate symbol (e.g., an invalid symbol or a SYNCM/2).

In response to the symbol being a valid symbol in block 512 control transfers to block 514, where samples of the symbol are stored in a buffer (SYNC_BUFFER=[SYNC_BUFFER;Y], a channel weight estimate that may be used during demodulation is stored in a buffer (CHAN_ESTIM_WT=[CHAN_ESTIM_WT;K]), and a frame control header start estimate is stored in a frame control header start estimate buffer (FCH_START_EST= [ ]), all of which buffers may be implemented in the buffer block 302. It should be appreciated that the frame control header start estimate buffer is initially empty. Next, in decision block 516, a determination is made by the frame synchronization block 306 as to whether the detected preamble symbol is a SYNCP (i.e., whether K>0). If the preamble symbol is a SYNCP in block 516 control transfers to block 518, where an indication that a SYNCP was detected is stored by setting SYNC_DET_HIST equal to one (SYNC_DET_HIST=[SYNC_DET_HIST;1]).

Next, in block 520, the frame search index is incremented by (SIDX=SIDX+N). Then, in decision block 522 a determination is made by the frame synchronization block 306 as to whether a preamble length constraint (SIDX-SYMBOL_SYNC_IDX)/N>K) has been exceeded. In response to the preamble length constraint not being exceeded in block 522, control returns to block 508 where samples for a next symbol are retrieved from the buffer block 302. In response to the preamble length constraint being exceeded in block 522, control transfers to block 524 where a preamble length flag (PREAMBLE_LENGTH_FLAG) is set to indicate the preamble length of full preamble symbols would be exceed if samples for another preamble symbol were retrieved from the buffer block 302. Next, in block 526 an FCH demodulation is scheduled at an estimated FCH start point (FCH_START_EST=SIDX+N/2).

Then, in block 528, the frame search synchronization is stopped and FCH demodulation is performed at a frame synchronization index (FRAME_SYNC_IDX=FCH_START_EST). Next, in block 530, the FCH is demodulated and decoded. Then, in decision block 532, a determination is made as to whether the FCH is valid, e.g., whether the FCH passed a cyclic redundancy check (CRC). In response to the FCH being valid in block 532 control transfers to block 534, where the correlation is stopped and payload demodulation is initiated. In response to the FCH not being valid in block 532 control transfers to decision block 536, where a determination is made as to whether the preamble length flag (PREAMBLE_LENGTH_FLAG) is set. In response to the preamble length flag (PREAMBLE_LENGTH_FLAG) being set in block 536 control transfers to block 538, where a 'frame synchronization failure' message is returned to a calling routine. In response to the preamble length flag (PREAMBLE_LENGTH_FLAG) not being set in block 536 control returns to block 508, where samples for another preamble symbol are retrieved from the buffer block 302.

If the preamble symbol is not a SYNCP in block 516 control transfers to block 540, where an indication that a SYNCM was detected is stored by setting SYNC_DET_HIST equal to negative one (SYNC_DET_HIST=[SYNC_DET_HIST;−1]) and a frame synchronization index (FRAME_SYNC_IDX) is set equal to the frame search index (SIDX). From block 540 control transfers to block 526, where an FCH demodulation is scheduled by the frame synchronization block 306 at an estimated FCH start point.

In response to the current symbol not being a valid symbol in block 512 control transfers to decision block 542, where the frame synchronization block 306 determines whether an immediately previous symbol was a SYNCP (SYNC_DET_HIST(END)=1). In response to an immediately previous symbol being a SYNCP in block 542, control transfers to block 544 where the current symbol is marked as an invalid (corrupted) symbol (SYNC_DET_HIST=[SYNC_DET_HIST;0]) by the frame synchronization block 306. Next, control transfers to block 520, where the frame search index is incremented by 'N' (SIDX=SIDX+N). In response to the immediately previous symbol not being a SYNCP in block 542, control transfers to decision block 546 where the frame synchronization block 306 determines whether the previous symbol was a corrupted symbol (SYNC_DET_HIST(END−1:END)=[1 0]). In response to an immediately previous symbol being corrupted in block 546 (indicating two corrupted symbols in succession), control transfers to block 548 where the frame synchronization block 306 marks the symbol as a corrupted symbol (SYNC_DET_HIST=[SYNC_DET_HIST;0]) and control then transfers to block 520.

In response to an immediately previous symbol not being corrupted in block 546 (indicating the previous symbol was a SYNCM), control transfers to block 550 where the frame synchronization block 306 determines a starting frame index (TIDX=SIDX+N) for a SYNCM/2 (which has a magnitude that is one-half the magnitude of the SYNCM), retrieves samples for the SYNCM/2 (Y1=RXSAMPLES(TIDX: TIDX+(N/2)−1)) from the buffer block 302, and performs symbol correlation for a SYNCM/2 to provide a correlation value (K1=Y1*CONJ(SYNCP_SYMBOL(1:N/2))). Next, in decision block 552 the frame synchronization block 306 determines whether a magnitude of the correlation value of the SYNCM/2 symbol is greater than the first threshold (|K1|>THRESHOLD1). In response to the magnitude of the correlation value of the SYNCM/2 being greater than the first threshold in block 552, control transfers to block 554 where the frame synchronization block 306 schedules FCH demodulation at an estimated FCH start point (FCH_START_EST=TIDX+(N/2)). From block 554 control transfers to block 528. In response to the magnitude of the correlation value of the SYNCM/2 not being greater than the first threshold in block 552, control transfers to block 520. It should be appreciated that a preamble detector configured according to the present disclosure may implement process 500 in its entirety or in part.

Figure 7:
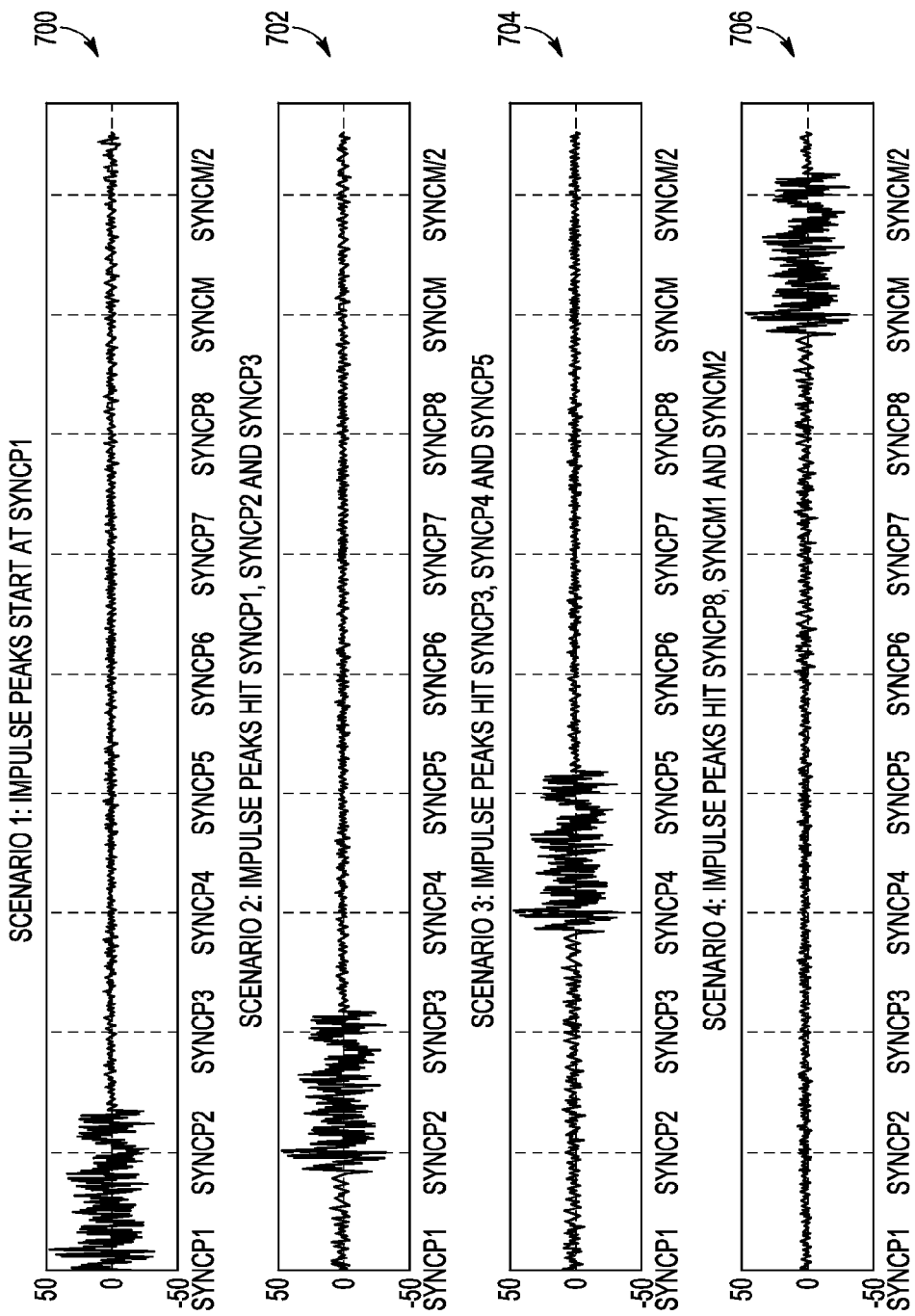
FIG. 7 illustrates four preamble signal scenarios with impulse peaks occurring in different locations in the different preamble signal scenarios.

FIG. 7 illustrates four example preamble signal scenarios with impulse peaks occurring in different locations in the different preamble signal scenarios. In a first scenario, illustrated in graph 700, an impulse peak hits SYNCP1 and SYNCP2. In the first scenario, it is relatively easy to achieve frame synchronization using conventional time-domain approaches. In a second scenario, illustrated in graph 702, an impulse peak hits SYNCP1, SYNCP2, and SYNCP3. In the second scenario, it is generally possible to achieve frame synchronization using conventional time-domain approaches using a lower preamble detection threshold, which can potentially increase the probability of false detection in a receiver. In a third scenario, illustrated in graph 704, an impulse peak hits SYNCP3, SYNCP4, and SYNCP5. In the third scenario, conventional time-domain approaches typically fail to achieve robust frame synchronization unless an enhancement mechanism is implemented. In a fourth scenario, illustrated in graph 706, an impulse peak hits SYNCP8, SYNCM, and SYNCM/2. In the fourth scenario, conventional time-domain approaches fail to achieve frame synchronization as frame synchronization symbols are destroyed. It should be appreciated that the disclosed techniques may be used to reliably synchronize frames in all of the above scenarios.

Figure 8:
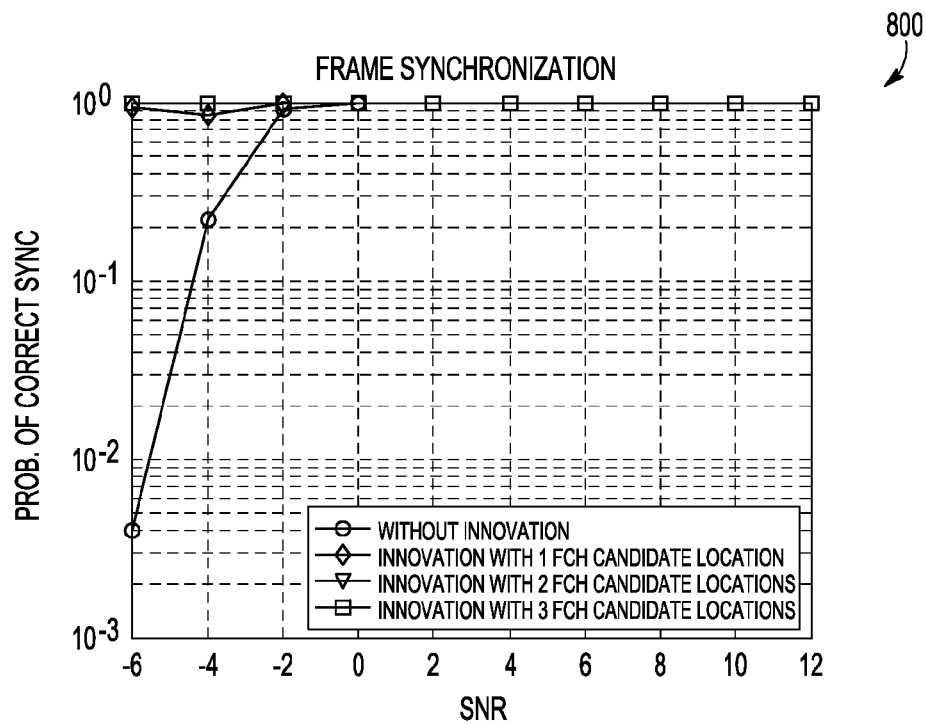
FIG. 8 is an exemplary simulated performance graph illustrating frame synchronization performance for embodiments that implement the disclosed techniques contrasted with an embodiment that does not implement the disclosed techniques when a noise impulse affects the first five preamble symbols (i.e., SYNCP1 through SYNCP5) of a G3-PLC frame.

With reference to FIG. 8, an exemplary simulated performance graph 800 illustrates frame synchronization performance for embodiments that implement the disclosed techniques and an embodiment that does not implement the disclosed techniques when a noise impulse duration of 1.5 symbols randomly affects the first five preamble symbols (i.e., SYNCP1 through SYNCP5) of a G3-PLC frame. From the simulation, it was observed that the probability of correct synchronization starts dropping for a conventional time-domain approach below 0 dB signal-to-noise ratio (SNR). The graph 800 also shows results for two partial implementations and one full implementation of the disclosed techniques.

In FIGS. 8 and 10-13, the plots labeled '1 FCH candidate location' are for partial implementation of the proposed techniques, where a portion of the process 500 from the off-page connector 'E' (i.e., FIG. 6) is not implemented. The plots labeled '2 FCH candidate locations' implement history for up to two corrupted preamble symbols and the last conditional branch on the right in FIG. 6 that tests the last SYNCM2 symbol (i.e., SYNCM/2 for ITU G.9903 and G3-PLC) is not implemented. The plots labeled '3 FCH candidate locations' implement the entire process 500. As is illustrated in FIG. 8, a 2 dB improvement is achieved by implementing 1 FCH candidate location portion of the process 500, while a 4 dB improvement is realized by implementing the process 500 up to the 2 FCH candidate location. It should be noted that the performance of the frame synchronization using the proposed techniques does not degrade sharply to the left of the break-away SNR values at which the frame synchronization is less than one-hundred percent as exhibited by the conventional time-domain synchronization approach. For the full implementation of the proposed techniques more than a 6 dB improvement is achieved under low SNR conditions. All partial and full FCH candidate location implementations of the proposed techniques have acceptable performance for G3-PLC NB-OFDM.

Figure 9:
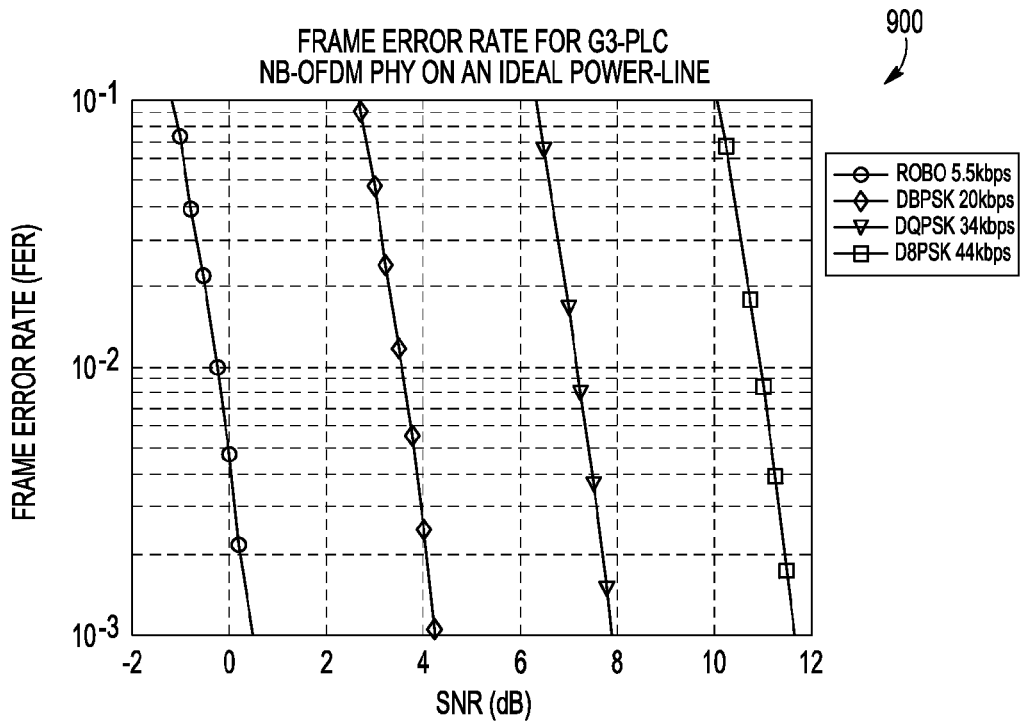
FIG. 9 is an exemplary simulated performance graph illustrating frame synchronization performance required for G3-PLC narrowband-orthogonal frequency division multiplexing physical (NB-OFDM PHY) on an ideal power-line for various exemplary modulation schemes.

With reference to FIG. 9, an exemplary simulated frame error rate (FER) or packet error rate (PER) performance graph 900 illustrates the theoretical probability of maximum length correct frame reception required for G3-PLC for various standard specified exemplary differential modulation schemes. It should be noted that due to physical (PHY) signal processing limitations, the packet length in G3-PLC using differential modulation with all OFDM subcarriers enabled is: 133 bytes using ROBO modulation; 235 bytes for differential binary phase-shift keying (DBPSK) and differential quadrature phase-shift keying (DQPSK); and 226 bytes for differential eight phase-shift keying (D8PSK) modulation. Specifically, the graph 900 illustrates the frame (or packet) error rate performance of ROBO modulation at 5.5 kbps, DBPSK modulation at 20 kbps, DQPSK modulation at 34 kbps, and D8PSK modulation at 44 kbps. The graph 900 indicates when receiving maximum length packets with a ten percent FER the required SNR for: ROBO modulation is −1.2 dB; DBPSK is 2.7 dB; DQPSK is 6.3 dB; and D8PSK is 10.1 dB. It should be appreciated that the required SNR for receiving a shorter packet with the same probability is lower. For example, receiving a 30 byte packet using ROBO modulation with a ten percent FER the required SNR is only 1.9 dB.

Practically, it is desirable that the probability of packet detection is not limited by the preamble detection/frame synchronization process, which is why it is desirable that frame synchronization should be able to detect all packets for which the PHY demodulator can potentially decode. As discussed above, a packet can be potentially decoded for an SNR down to −1.9 dB (or better) using ROBO modulation because of the extensive forward error correction techniques used in NB-OFDM power-line communication systems. A robust frame synchronization scheme for such a standard needs to achieve reliable packet detection/synchronization for a received packet SNR of −2 dB or better. It should be appreciated from review of FIGS. 8 and 10-13 that the conventional time-domain scheme fails to meet this requirement.

Figure 10:
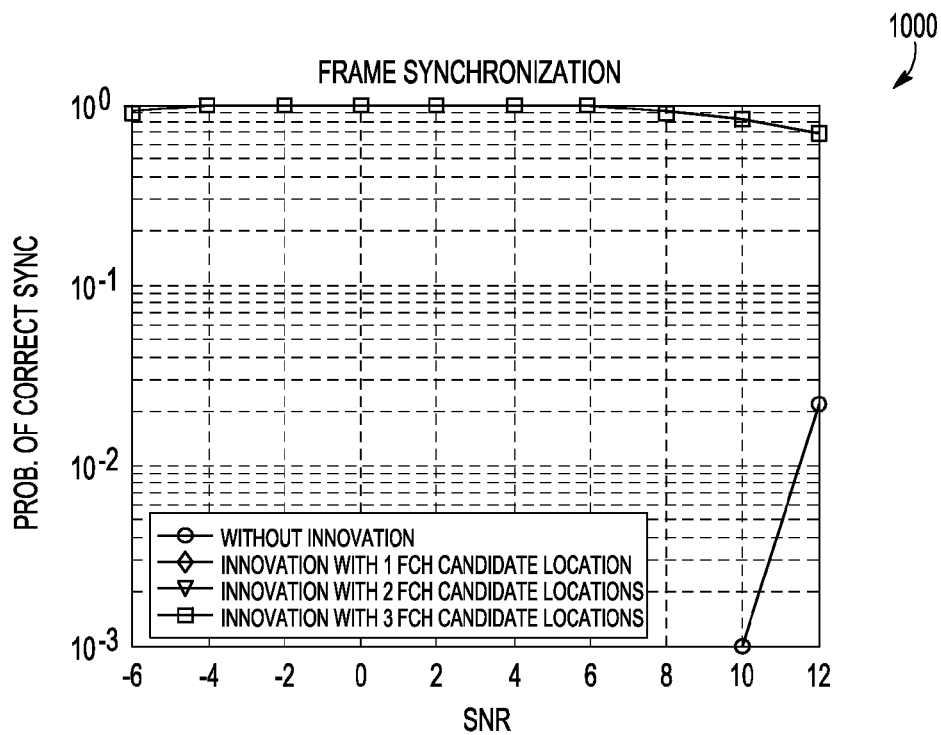
FIG. 10 is an exemplary simulated performance graph illustrating frame synchronization performance for embodiments that implement the disclosed techniques contrasted with an embodiment that does not implement the disclosed techniques when a noise impulse affects the sixth and seventh preamble symbols (i.e., SYNCP6 and SYNCP7) of a G3-PLC frame.
Figure 11:
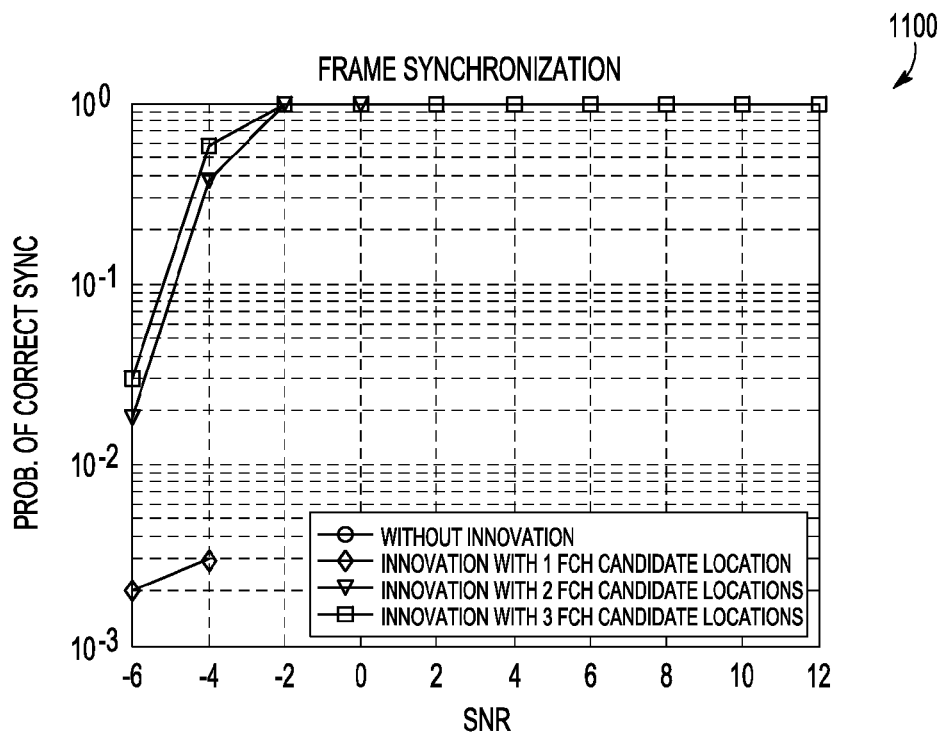
FIG. 11 is an exemplary simulated performance graph illustrating frame synchronization performance for embodiments that implement the disclosed techniques contrasted with an embodiment that does not implement the disclosed techniques when a noise impulse affects the eighth, ninth, and tenth preamble symbols (i.e., SYNCP8, SYNCM1, and SYNCM2) of a G3-PLC frame.

With reference to FIG. 10, an exemplary simulated performance graph 1000 illustrates frame synchronization performance for embodiments that implement the disclosed techniques and an embodiment that does not implement the disclosed techniques when a noise impulse affects the sixth and seventh preamble symbols (i.e., SYNCP6 and SYNCP7) of a G3-PLC frame. As is illustrated, conventional time-domain frame synchronization requires 12 dB to achieve close to twenty percent frame synchronization. Using the proposed techniques, a 10 dB improvement is achieved under low SNR conditions and all FCH candidate locations have acceptable performance for G3-PLC NB-OFDM With reference to FIG. 11, an exemplary simulated performance graph 1100 illustrates frame synchronization performance for embodiments that implement the disclosed techniques and an embodiment that does not implement the disclosed techniques when a noise impulse affects the eighth, ninth, and tenth preamble symbols (i.e., SYNCP8, SYNCM1, and SYNCM2) of a G3-PLC frame. It should be appreciated that frame synchronization cannot be achieved with conventional time-domain approaches when a noise impulse affects the eighth, ninth, and tenth preamble symbols. From the simulation, it is observed that the use of only one FCH candidate location fails to provide acceptable performance. In contrast, using either two or three FCH candidate locations meets the −2 dB SNR one-hundred percent frame synchronization accuracy requirement. However, the full implementation performs better at lower SNR conditions and, as such, provides desirable margin under noisy conditions.

Figure 12:
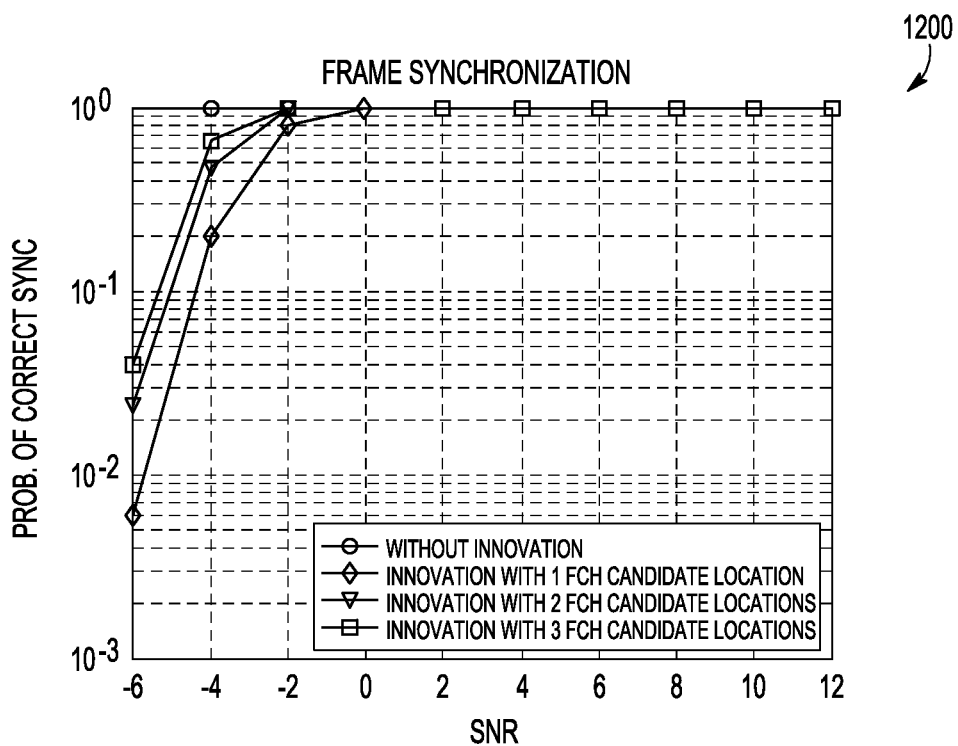
FIG. 12 is an exemplary simulated performance graph illustrating frame synchronization performance for embodiments that implement the disclosed techniques contrasted with an embodiment that does not implement the disclosed techniques when a noise impulse affects the ninth preamble symbol (i.e., SYNCM1) of a G3-PLC frame.

With reference to FIG. 12, an exemplary simulated performance graph 1200 illustrates frame synchronization performance for embodiments that implement the disclosed techniques and an embodiment that does not implement the disclosed techniques when a noise impulse affects the ninth preamble symbol (i.e., SYNCM1) of a G3-PLC frame. It should be appreciated that frame synchronization cannot be achieved with conventional time-domain approaches when a noise impulse affects the ninth preamble symbol, which contains the frame synchronization marker. Using the proposed techniques one-hundred percent frame synchronization is achieved for an SNR down to 0 dB using one FCH candidate location and −2 dB using two or more FCH candidate locations.

Figure 13:
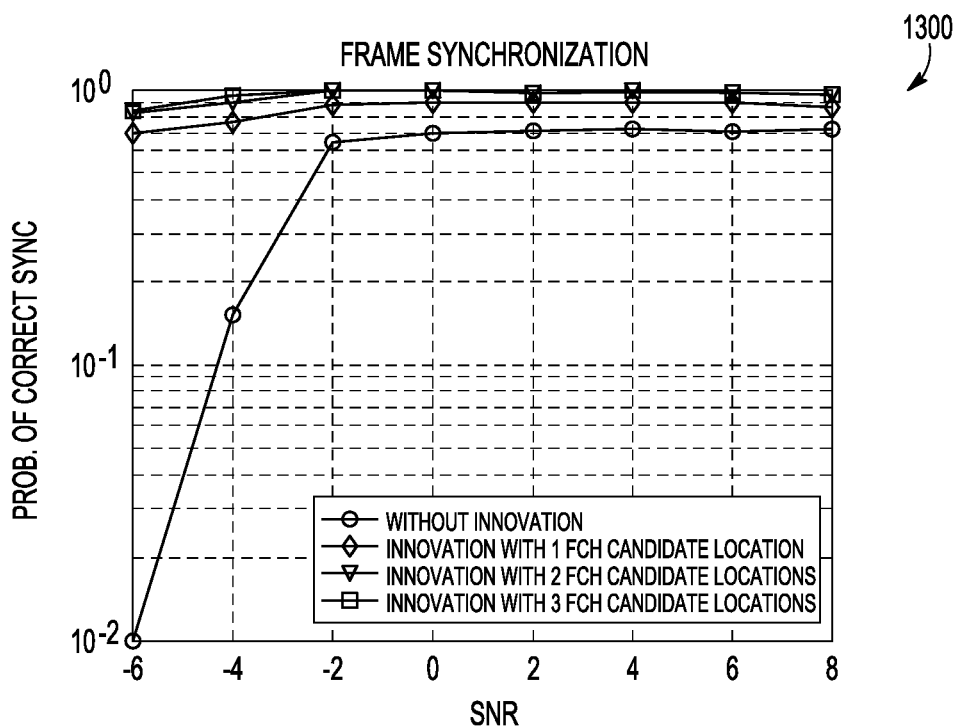
FIG. 13 is an exemplary simulated performance graph for one-thousand simulations illustrating frame synchronization performance for embodiments that implement the disclosed techniques contrasted with an embodiment that does not implement the disclosed techniques when a noise impulse affects random preamble symbols of a G3-PLC frame.

With reference to FIG. 13, an exemplary simulated performance graph 1300 for one-thousand simulations illustrates frame synchronization performance for embodiments that implement the disclosed techniques contrasted with an embodiment that does not implement the disclosed techniques when a noise impulse affects random preamble symbols with a uniform distribution of a G3-PLC frame. One-hundred percent frame synchronization may be achieved using the proposed techniques with an SNR greater than −2 dB when two or more FCH candidate locations are used. Using partial implementation of the proposed techniques using one FCH candidate location the frame synchronization performance is limited to ninety percent even for higher SNRs indicating that at least support for two FCH candidate location search needs to be implemented to achieve robust performance. In contrast, the conventional time-domain technique only achieves roughly a seventy percent success rate even for a received signal SNR of 0 dB or higher.

Accordingly, techniques have been disclosed herein that advantageously perform time-domain synchronization of packets while reliably achieving frame synchronization.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of frame synchronization in a communication system, comprising:
    performing, using a preamble detector, symbol correlation on received signal samples;
    determining, using the preamble detector, whether a magnitude of the symbol correlation is greater than a first threshold;
    in response to the magnitude of the symbol correlation being greater than the first threshold, indicating, using the preamble detector, the received symbol is a valid symbol;
    in response to the magnitude of the symbol correlation being less than the first threshold, indicating, using the preamble detector, the received symbol is an indeterminate symbol;
    determining whether the valid symbol is a first type symbol;
    in response to the valid symbol being the first type symbol, determining whether a preamble length will be exceeded if symbol correlation is performed on additional received signal samples;
    in response to determining the preamble length will not be exceeded if symbol correlation is performed on the additional received signal samples, performing symbol correlation on the additional received signal samples;
    in response to determining the preamble length will be exceeded if symbol correlation is performed on the additional received signal samples, estimating a first starting point of a frame control header; and
    attempting demodulation of the frame control header at the estimated first starting point of the frame control header.

2. The method of claim 1, further comprising:
    determining whether the demodulation of the frame control header was successful at the estimated first starting point;
    in response to the demodulation of the frame control header being successful at the estimated first starting point, initiating payload demodulation; and
    in response to the demodulation of the frame control header not being successful at the estimated first starting point, indicating a synchronization failure.

3. The method of claim 1, further comprising:
    determining whether the valid symbol is a second type symbol different than the first type symbol;

in response to the valid symbol being the second type symbol, estimating a second starting point of the frame control header; and attempting demodulation of the frame control header at the estimated second starting point of the frame control header.

4. The method of claim 3, further comprising:

determining whether the demodulation of the frame control header was successful at the estimated second starting point;

in response to the demodulation of the frame control header being successful at the estimated second starting point, initiating payload demodulation;

in response to the demodulation of the frame control header not being successful at the estimated second starting point, determining whether the preamble length will be exceeded if symbol correlation is performed on additional received signal samples;

in response to determining the preamble length will not be exceeded if symbol correlation is performed on the additional received signal samples, performing symbol correlation on the additional received signal samples; and in response to determining the preamble length will be exceeded if symbol correlation is performed on the additional received signal samples, indicating a synchronization failure.

5. The method of claim 1, wherein the communication system is a power-line communication system.

6. A method of frame synchronization in a communication system, comprising:

performing, using a preamble detector, symbol correlation on received signal samples;

determining, using the preamble detector, whether a magnitude of the symbol correlation is greater than a first threshold;

in response to the magnitude of the symbol correlation being greater than the first threshold, indicating, using the preamble detector, the received symbol is a valid symbol;

in response to the magnitude of the symbol correlation being less than the first threshold, indicating, using the preamble detector, the received symbol is an indeterminate symbol;

in response to the received symbol being an indeterminate symbol, determining whether an immediately prior symbol was a first type symbol;

in response to the immediately prior symbol being a first type symbol, marking the received symbol as an invalid symbol;

determining whether a preamble length will be exceeded if symbol correlation is performed on additional received signal samples;

in response to determining the preamble length will not be exceeded if symbol correlation is performed on the additional received signal samples, performing symbol correlation on the additional received signal samples;

in response to determining the preamble length will be exceeded if symbol correlation is performed on the additional received signal samples, estimating a third starting point of the frame control header; and attempting demodulation of the frame control header at the estimated third starting point of the frame control header.

7. The method of claim 6, further comprising:

determining whether the demodulation of the frame control header was successful at the estimated third starting point;

in response to the demodulation of the frame control header being successful at the estimated third starting point, initiating payload demodulation; and in response to the demodulation of the frame control header not being successful at the estimated third starting point, indicating a synchronization failure.

8. The method of claim 6, further comprising:

in response to the immediately prior symbol being an invalid symbol, marking the received symbol as an invalid symbol;

determining whether a preamble length will be exceeded if symbol correlation is performed on additional received signal samples;

in response to determining the preamble length will not be exceeded if symbol correlation is performed on the additional received signal samples, performing symbol correlation on the additional received signal samples;

in response to determining the preamble length will be exceeded if symbol correlation is performed on the additional received signal samples, estimating a fourth starting point of the frame control header; and attempting demodulation of the frame control header at the estimated fourth starting point of the frame control header.

9. The method of claim 8, further comprising:

in response to the immediately prior symbol being a second type symbol, determining whether the received preamble signal is a third type symbol whose magnitude is greater than a second threshold;

in response to the received preamble signal being the third type symbol, estimating a fifth starting point of the frame control header and attempting demodulation of the frame control header at the estimated fifth starting point;

in response to the received preamble signal not being the third type symbol, determining whether a preamble length will be exceeded if symbol correlation is performed on additional received signal samples;

in response to determining the preamble length will not be exceeded if symbol correlation is performed on the additional received signal samples, performing symbol correlation on the additional received signal samples;

in response to determining the preamble length will be exceeded if symbol correlation is performed on the additional received signal samples, estimating a sixth starting point of the frame control header; and attempting demodulation of the frame control header at the estimated sixth starting point of the frame control header.

10. The method of claim 9, wherein the valid symbol includes a SYNCM and a SYNCP symbol and the indeterminate symbol includes a corrupted symbol and a SYNCM/2 symbol.

11. The method of claim 6, wherein the communication system is a power line communication system.

12. A receiver, comprising:

a buffer configured to store received signal samples; and a preamble detector coupled to the buffer, wherein the preamble detector is configured to:

carry out symbol correlation on the received signal samples;

ascertain whether a magnitude of the symbol correlation is greater than a first threshold;

in response to the magnitude of the symbol correlation being greater than the first threshold, specify the received symbol is a valid symbol;

in response to the magnitude of the symbol correlation being less than the first threshold, specify the received symbol is an indeterminate symbol;

ascertain whether the valid symbol is a first type symbol;

in response to the valid symbol being the first type symbol, ascertain whether a preamble length will be exceeded if symbol correlation is carried out on additional received signal samples;

in response to ascertaining the preamble length will not be exceeded if symbol correlation is carried out on the additional received signal samples, carry out symbol correlation on the additional received signal samples;

in response to ascertaining the preamble length will be exceeded if symbol correlation is carried out on the additional received signal samples, calculate a first starting point of a frame control header and try demodulation of the frame control header at the calculated first starting point of the frame control header;

ascertain whether the demodulation of the frame control header was successful at the calculated first starting point;

in response to the demodulation of the frame control header being successful at the calculated first starting point, commence payload demodulation; and in response to the demodulation of the frame control header not being successful at the calculated first starting point, specify a synchronization failure.

13. The receiver of claim 12, wherein the preamble detector is further configured to:

ascertain whether the valid symbol is a second type symbol different than the first type symbol; and in response to the valid symbol being the second type symbol, calculate a second starting point of the frame control header and try demodulation of the frame control header at the calculated second starting point of the frame control header.

14. The receiver of claim 13, wherein the preamble detector is further configured to:

ascertain whether the demodulation of the frame control header was successful at the calculated second starting point;

in response to the demodulation of the frame control header being successful at the calculated second starting point, commence payload demodulation;

in response to the demodulation of the frame control header not being successful at the calculated second starting point, ascertain whether the preamble length will be exceeded if symbol correlation is carried out on additional received signal samples;

in response to ascertaining the preamble length will not be exceeded if symbol correlation is carried out on the additional received signal samples, carry out symbol correlation on the additional received signal samples; and in response to ascertaining the preamble length will be exceeded if symbol correlation is carried out on the additional received signal samples, specify a synchronization failure.

15. A receiver, comprising:

a buffer configured to store received signal samples; and a preamble detector coupled to the buffer, wherein the preamble detector is configured to:

carry out symbol correlation on the received signal samples;

ascertain whether a magnitude of the symbol correlation is greater than a first threshold;

in response to the magnitude of the symbol correlation being greater than the first threshold, specify the received symbol is a valid symbol;

in response to the magnitude of the symbol correlation being less than the first threshold, specify the received symbol is an indeterminate symbol;

in response to the received symbol being an indeterminate symbol, ascertain whether an immediately prior symbol was a first type symbol;

in response to the immediately prior symbol being a first type symbol, denote the received symbol as an invalid symbol;

ascertain whether a preamble length will be exceeded if symbol correlation is carried out on additional received signal samples;

in response to ascertaining the preamble length will not be exceeded if symbol correlation is carried out on the additional received signal samples, carry out symbol correlation on the additional received signal samples; and in response to ascertaining the preamble length will be exceeded if symbol correlation is carried out on the additional received signal samples, calculate a third starting point of the frame control header and try demodulation of the frame control header at the calculated third starting point of the frame control header.

16. The receiver of claim 15, wherein the preamble detector is further configured to:

ascertain whether the demodulation of the frame control header was successful at the calculated third starting point;

in response to the demodulation of the frame control header being successful at the calculated third starting point, initiate payload demodulation; and in response to the demodulation of the frame control header not being successful at the calculated third starting point, denote a synchronization failure.

17. The receiver of claim 15, wherein the preamble detector is further configured to:

in response to the immediately prior symbol being an invalid symbol, denote the received symbol as an invalid symbol;

ascertain whether a preamble length will be exceeded if symbol correlation is carried out on additional received signal samples;

in response to ascertaining the preamble length will not be exceeded if symbol correlation is carried out on the additional received signal samples, carry out symbol correlation on the additional received signal samples; and in response to ascertaining the preamble length will be exceeded if symbol correlation is carried out on the additional received signal samples, calculate a fourth starting point of the frame control header and try demodulation of the frame control header at the calculated fourth starting point of the frame control header.

18. The receiver of claim 17, wherein the preamble detector is further configured to:

in response to the immediately prior symbol being a second type symbol, ascertain whether the received preamble signal is a third type symbol whose magnitude is greater than a second threshold;

in response to the received preamble signal being the third type symbol, calculate a fifth starting point of the frame control header and try demodulation of the frame control header at the calculated fifth starting point;

in response to the received preamble signal not being the third type symbol, ascertain whether a preamble length will be exceeded if symbol correlation is carried out on additional received signal samples;

in response to ascertaining the preamble length will not be exceeded if symbol correlation is carried out on the additional received signal samples, carry out symbol correlation on the additional received signal samples; and in response to ascertaining the preamble length will be exceeded if symbol correlation is carried out on the additional received signal samples, calculate a sixth starting point of the frame control header and try demodulation of the frame control header at the calculated sixth starting point of the frame control header.

19. A method of frame synchronization in a power-line communication system, comprising:

performing, using a preamble detector of a smart meter, symbol correlation on received signal samples, wherein the smart meter is coupled to a central station via a hub, and wherein the smart meter reports a utility usage;

determining, using the preamble detector of the smart meter, whether a magnitude of the symbol correlation is greater than a first threshold;

in response to the magnitude of the symbol correlation being greater than the first threshold, indicating, using the preamble detector of the smart meter, the received symbol is a valid symbol, wherein the valid symbol includes a first type symbol and a second type symbol that is different from the first type symbol;

in response to the magnitude of the symbol correlation being less than the first threshold, indicating, using the preamble detector of the smart meter, the received symbol is an indeterminate symbol, wherein the indeterminate symbol includes an invalid symbol and a third type symbol that is different from the second type symbol;

determining, using the preamble detector of the smart meter, whether the valid symbol is a first type symbol;

in response to the valid symbol being the first type symbol, determining, using the preamble detector of the smart meter, whether a preamble length will be exceeded if symbol correlation is performed on additional received signal samples;

in response to determining the preamble length will not be exceeded if symbol correlation is performed on the additional received signal samples, performing, using the preamble detector of the smart meter, symbol correlation on the additional received signal samples;

in response to determining the preamble length will be exceeded if symbol correlation is performed on the additional received signal samples, estimating, using the preamble detector of the smart meter, a first starting point of a frame control header; and attempting, using a demodulator of the smart meter, demodulation of the frame control header at the estimated first starting point of the frame control header.

\* \* \* \* \*